(12) United States Patent
Tonelli et al.

(10) Patent No.: US 6,509,509 B2
(45) Date of Patent: Jan. 21, 2003

(54) PROCESS FOR THE PREPARATION OF PERFLUOROPOLYOXYALKYLENES WITH HYDROXYL END GROUPS

(75) Inventors: Claudio Tonelli, Milan (IT); Antonio Russo, Milan (IT); Ezio Strepparola, Bergamo (IT)

(73) Assignee: Ausimont S.p.A., Milan (IT)

(*) Notice: Subject to any disclaimer, the term of this patent is extended or adjusted under 35 U.S.C. 154(b) by 0 days.

(21) Appl. No.: 09/750,101

(22) Filed: Dec. 29, 2000

(65) Prior Publication Data

US 2001/0007046 A1 Jul. 5, 2001

(30) Foreign Application Priority Data

Jan. 4, 2000 (IT) ...................... MI2000A0003

(51) Int. Cl.$^7$ .......................... C07C 43/11; C07C 43/18; C07C 43/20
(52) U.S. Cl. ...................... 568/606; 568/614; 568/615; 568/677; 568/683; 568/864
(58) Field of Search ................... 568/677, 683, 568/864, 615, 606, 614

(56) References Cited

U.S. PATENT DOCUMENTS

| | | |
|---|---|---|
| 3,242,218 A | 3/1966 | Miller |
| 3,665,041 A | 5/1972 | Sianesi et al. |
| 3,715,378 A | 2/1973 | Sianesi et al. |
| 3,766,251 A | 10/1973 | Caporiccio et al. |
| 3,810,874 A | 5/1974 | Mitsch et al. |
| 3,847,978 A | 11/1974 | Sianesi et al. |
| 4,094,911 A | 6/1978 | Mitsch et al. |
| 4,523,039 A | 6/1985 | Lagow et al. |
| 5,144,092 A | 9/1992 | Marraccini et al. |
| 5,714,637 A | 2/1998 | Marchionni et al. |

FOREIGN PATENT DOCUMENTS

| | | |
|---|---|---|
| EP | 0 148 482 A2 | 7/1985 |
| GB | 1104482 | 2/1968 |
| GB | 1309401 | 3/1973 |

OTHER PUBLICATIONS

Database CAPLUS on STN, Acc. No. 1994:8176., Juhike et al., 'Improved method for synthesis of difunctional fluroalcohols.' Exfluor Res. Corp. Report (1991), Ord.. No. AD–A245070. Gov. Rep. Announce. Index (US) 1992, 92(9), Abstr. No. 222,829, abstract.*

* cited by examiner

Primary Examiner—Brian J. Davis
(74) Attorney, Agent, or Firm—Arent Fox Kintner Plotkin & Kahn PLLC

(57) ABSTRACT

A process for preparing perfluoropolyoxyalkylenes with hydroxyl end groups having structure:

$$T_1\text{—}CFW_1\text{—}O\text{—}R_f\text{—}CFW_2\text{—}T_2 \qquad (I)$$

wherein: $T_1$, $T_2$, are selected from —$CH_2OH$, —F, —$CF_3$, —$CF_2CF_3$ with the proviso that at least one of $T_1$ and $T_2$ is —$CH_2OH$;

$W_1$ and $W_2$ are selected from F, $CF_3$;

$R_f$ is a perfluoropolyoxyalkylene chain having a number average molecular weight 500–10,000 comprising one or more units of the type —$CF_2CF_2O$—, —$CF_2O$—, —$C_3F_6O$—, —$CF_2(CF_2)_zCF_2O$— (z=1,2); —$CR_4R_5CF_2CF_2O$— with $R_4$ and $R_5$ selected from H, Cl, perfluoroalkyl group; said process comprising the following steps:

a) adding an ester precursor having structure (I) and $T_1$, $T_2$ end groups selected from —F, —$CF_3$, —$CF_2CF_3$, —COOR (R=linear or branched alkyl group having a number of C atoms from 1 to 5), with the proviso that at least one of $T_1$ and $T_2$ is —COOR, in a reaction mixture formed by:
   an inert or protic reaction solvent;
   a reducing agent selected from metal hydrides;
   an unreactive organic base with respect to the ester;
b) hydrolysis of the product obtained in step a) for obtaining the compounds of structure (I) with at least a —$CH_2OH$ end group.

14 Claims, No Drawings

PROCESS FOR THE PREPARATION OF PERFLUOROPOLYOXYALKYLENES WITH HYDROXYL END GROUPS

The invention relates to a process for the preparation of perfluoropolyoxyalkylenes functionalized with hydroxyl end groups.

Specifically the invention relates to a process for the preparation of monofunctional and bifunctional perfluoropolyoxyalkylenes having end groups of —$CH_2OH$ type starting from the corresponding perfluoropolyoxyalkylenes having —COOR end groups (R=$C_1$–$C_5$ alkyl). Said process has a higher productivity since in the reduction reaction a lower amount of reducing agent is used. Further a lower hydrogen development is noticed during the reaction. This makes the process better controllable from the industrial safety point of view and economically cheaper.

Monofunctional and bifunctional perfluoropolyoxyalkylenes having hydroxyl end groups of the —$CH_2OH$ type are known in the prior art.

These compounds are described, for example, in U.S. Pat. No. 3,766,251 and U.S. Pat. No. 3,810,874 and they can be used for example as lubricants for magnetic discs or as macromonomers for the preparation of polyurethane, polyester, polyether copolymers, epoxy resins, etc.

The perfluoropolyethers with hydroxyl end groups can be prepared by reduction of the corresponding ester precursors, i.e. starting from perfluoropolyethers having one or two end groups —COOR wherein R is a linear or branched C1–C5 alkyl. Said process is described for example in the patents GB 1,309,401, U.S. Pat. No. 3,847,978.

Generally in the known processes, the reduction reaction is carried out by using reducing agents in inert solvents. Among the reducing agents metal hydrides, such as for example lithium-aluminum hydride ($LiAlH_4$), dissolved in inert solvents such as tetrahydrofuran, diglyme or dioxane can be mentioned; preferably as reducing agent sodium-boron hydride ($NaBH_4$) in the above mentioned inert solvents or in protic solvents such as methanol, ethanol, is used.

When $NaBH_4$ is used as reducing agent, the stoichiometry of the reduction reaction of the ester precursor to the corresponding perfluoropolyether with hydroxyl end groups $CH_2OH$, implies the use of two equivalents of ester by mole of $NaBH_4$ and it does not involve hydrogen formation.

The process can be schematized with the following reactions, by using sodium-boron hydride as reducing agent and a bifunctional ester with both end groups —$COOC_2H_5$ as precursor:

1) $4[R_f(COOCH_2CH_3)_2]+4NaBH_4 \rightarrow [R_f(CH_2O)_2]_3B_2+R_f(CH_2ONa)_2++2(CH_3CH_2O)_4B^-$ 2) $[R_f(CH_2O)_2]_3B_2+R_f(CH_2ONa)_2+2(CH_3CH_2O)_4B^-+4HCl+12H_2O \rightarrow 4R_f(CH_2OH)_2+8CH_3CH_2OH+4H_3BO_3+4NaCl$.

However tests carried out by the Applicant show (see the comparative Examples) that said reduction reaction in order to reach an almost total conversion (higher than 99%), requires a large excess of reducing agent $NaBH_4$, generally higher than 60% with respect to the stoichiometric value. Another drawback is that during the reduction step a remarkable hydrogen amount develops, in the range 1.5–2 moles of hydrogen for each equivalent of ester. The large excess of reducing agent necessary for the reduction reaction and the remarkable volume of hydrogen developed during the reaction, result critical both from an economic point of view, due to the cost of the reducing agent, and from a point of view of to the process safety in an industrial plant. In fact the gaseous effluents must be diluted with large volumes of inert gas in order to bring the composition of the gaseous mixture, in particular the hydrogen concentration, under the inflammability and explosiveness limits (lower than 4% by volume).

The need was therefore felt to prepare functional perfluoropolyethers having —$CH_2OH$ end groups by a cheaper process from the economic point of view, furthermore characterized by a greater production combined with a greater reliability from the industrial safety point of view.

The Applicant has surprisingly and unexpectedly found that the reduction reaction to obtain perfluoropolyethers having hydroxyl —$CH_2OH$ end groups, starting from the corresponding ester precursors, can be advantageously carried out by adding in the reaction mixture besides the reducing agent, an organic base. It has been unexpectedly found that the presence of this organic base allows to carry out the reducing reaction by using a small excess of the reducing agent with respect to the stoichiometric amount, generally lower than 15%, and surprisingly that it inhibits the hydrogen development during the process.

It is therefore an object of the present invention a process for obtaining monofunctional and bifunctional perfluoropolyoxyalkylenes having hydroxyl end groups with structure:

wherein:

$T_1$, $T_2$, equal to or different from each other, are selected from end groups of the —$CH_2OH$, or —F, —$CF_3$, —$CF_2CF_3$ type with the proviso that at least one of $T_1$ and $T_2$ is —$CH_2OH$;

$W_1$ and $W_2$, equal to or different from each other, are F, $CF_3$;

$R_f$ is a perfluoropolyoxyalkylene chain having a number average molecular weight 500–10,000 comprising one or more units of the —$CF_2CF_2O$—, —$CF_2O$—, —$C_3F_6O$—, —$CF_2(CF_2)_zCF_2O$—, —$CR_4R_5CF_2CF_2O$— type;

wherein: z is an integer equal to 1 or 2;

$R_4$ and $R_5$, equal to or different from each other, are selected from H, Cl, linear or branched perfluoroalkyl groups having a number of C atoms from 1 to 4;

said units being statistically distributed along the perfluoropolyoxyalkylene chain;

said process comprising the following steps:

a) adding, under inert gas atmosphere, an ester precursor having structure (I) and $T_1$, $T_2$ end groups, equal to or different from each other, selected from —F, —$CF_3$, —$CF_2CF_3$, —COOR (R=linear or branched alkyl group having a number of C atoms from 1 to 5), with the proviso that at least one of $T_1$ and $T_2$ is —COOR, in a reaction mixture formed by:
   an inert or protic reaction solvent;
   a reducing agent selected from the metal hydride class;
   a non reactive organic base with respect to the ester;

b) hydrolysis of the product obtained in step a) for obtaining the compounds of structure (I) with at least a —$CH_2OH$ end group.

The organic bases used in the process of the present invention are selected from alcoholates and thioalcoholates of alkaline or alkaline-earth metals, having alkyl, cycloaliphatic, aromatic chain or combinations thereof; or nitrogenous bases which do not give condensation reactions with the fluorinated ester, such as for example amidation reactions. The following bases are preferably used: sodium or potassium alcoholates such as for example potassium terbutylate or sodium ethylate, more preferably sodium ethylate; in the class of the nitrogenous bases, alkyl, cycloalipahtic and aromatic tertiary amines, such as for example triethylamine, diazabicyclo-octane (DABCO), pyridine, can be mentioned. Also a mixture of the above mentioned organic bases can be used. Preferably as organic bases the class of the above mentioned alcoholates is used.

As solvents of the reaction inert solvents, such as for example, tetrahydrofuran, diglyme, dioxane or protic solvents such as for example methanol, ethanol, isopropanol, isobutanol or mixtures thereof, preferably ethanol, etc., can be used. Also mixtures of inert solvents and protic solvents can be used.

As reducing agents metal hydrides, such as for example lithium-aluminum hydride (LiAlH$_4$), sodium-boron hydride (NaBH$_4$), lithium-boron hydride, etc., dissolved in the above mentioned reaction solvents, can be used. Preferably as reducing agent, sodium-boron hydride is used.

In formula (I) $R_f$ preferably comprises the following repeating units statistically distributed along the polymer chain:

—(CF$_2$CF$_2$O)—, —(CFYO)— wherein Y is equal to F or CF$_3$,

—(C$_3$F$_6$O)—,

—(CF$_2$(CF$_2$)$_z$O)— wherein z is an integer equal to 2 or 3,

—CR$_4$R$_5$CF$_2$CF$_2$O— wherein R$_4$ and R$_5$, equal to or different from each other are selected from H, Cl or perfluoroalkyl group having 1–4 C atoms.

In particular the following fluoropolyether $R_f$ can be mentioned as the preferred ones:

   (A)

wherein Y is F or CF$_3$; a and b are integers such that the molecular weight is in the above mentioned range: a/b is in the range 10–100;

or the repeating units mentioned in (A) can be linked as follows:

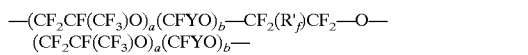

wherein R'$_f$ is a fluoroalkylene group from 1 to 4 C;

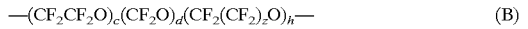   (B)

wherein c, d and h are integers such that the molecular weight is in the above mentioned range; c/d is in the range 0.1–10; h/(c+d) is in the range 0–0.05, z has the above mentioned value, h can also be equal to 0;

   (C)

wherein Y is F or CF$_3$; e, f, g are integers such that the molecular weight is in the above mentioned range; e/(f+g) is in the range 0.1–10, f/g is in the range 2–10;

   (D)

wherein s is an integer such as to give the above mentioned molecular weight, z has the already defined meaning;

   (E)

wherein R$_4$ and R$_5$ are equal to or different from each other and selected from H, Cl or perfluoroalkyl group, for example with 1–4 C atoms, j' being an integer such that the molecular weight is the above mentioned one; said unit inside the fluoropolyoxyalkylene chain can be linked each other as follows:

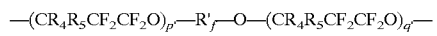

wherein R'$_f$ is fluoroalkylene group, for example from 1 to 4 C, p' and q' are integers such that the molecular weight is the above mentioned one;

   (F)

J" being an integer such as to give the above mentioned molecular weight.

(A) and (B) are particularly preferred structures.

These structures comprising the mentioned repeating units and the methods for the preparation thereof are described in the patents GB 1,104,482, U.S. Pat. No. 3,242,218, U.S. Pat. No. 3,665,041, U.S. Pat. No. 3,715,378, U.S. Pat. No. 3,665,041, EP 148,482, U.S. Pat. No. 4,523,039, U.S. Pat. No. 5,144,092, and for the functional derivatives see U.S. Pat. No. 3,810,874 and the patents mentioned in the prior art. All these patents are incorporated herein by reference.

The reaction for obtaining the invention compounds of formula (I) is preferably carried out at temperatures comprised between 0° C. and the boiling temperature of the solvent, preferably between 0° C. and 30° C.

In the reduction process of the present invention the reducing agent, preferably sodium-boron hydride, is used, in an amount in the range 0.1–15% by weight based on the solvent weight.

The used base amount can range between 0.1 and 100% by moles with respect to the reducing agent, preferably between 2 and 15% by moles, still more preferably between 5 and 15% by moles. The reducing agent excess, preferably sodium-boron hydride, necessary for reducing the ester, is in the range 0–30% with respect to the stoichiometric value, preferably 10–20%.

The product hydrolysis and isolation step (step b) is carried out according to known methods in the prior art. Generally hydrolysis is carried out by slowly adding the reaction product obtained in step a) to an aqueous HCl solution, preferably at a 5–10% concentration by weight, in an equiponderal amount with respect to the initially fed ester. The addition of the products of step a) to the acid solution is carried out gradually due to the hydrogen development deriving from the hydrolysis of the possible excess of the unreacted reducing agent. Alternatively, the hydrolysis step can be carried out by using water in a ratio by weight 2:1 with respect to the initially fed ester. Further aqueous washings can be optionally made at the end of step b) to completely eliminate the inorganic salts from the reduced fluorinated product.

The hydrolysis of the reaction products of step a) can be also carried by directly feeding the hydrolyzing solution or the water of step b) in the reaction mixture of step a).

With the process of the present invention it is possible to obtain an almost total conversion of the starting ester, higher than 99%, by using a reducing agent excess in the range 0–30% with respect to the stoichiometric value. Said excess of reducing agent is clearly lower than that used in the conventional processes of the prior art, where an excess higher than 60% is necessary. The selectivity of the invention process is higher than 99%.

The use of a lower amount of reducing agent leads, as a consequence, to a reduction of the amount of the necessary solvent in the mixture and therefore to a higher production with respect to the processes of the prior art, making the process more profitable from the economic and industrial point of view. Furthermore, the hydrogen development during the reaction is practically negligible or however remarkably reduced, of about 10 times, with respect to the reaction carried out in absence of organic base. This makes the process of the invention more controllable from a technological and therefore from a safety point of view. The planning and running of the industrial plant are simplified since the need to dilute, with large volumes of inert gas, the effluents in order to bring the composition under the inflammability and explosiveness limits of the gaseous mixture containing hydrogen, is eliminated. This avoids the need to foresee and set up a suitable unit of treatment of these effluents in order not to pollute the environment with reactants, solvents and/or reaction intermediates.

The use of a lower production ratio by weight between reducing agent and obtained product of structure I, up to a reduction of about 40% in the case of sodium-boron hydride, allows, the operating conditions being equal, to reduce the solvent amount necessary to carry out the reduction. There is therefore an increased production as well as a saving of raw materials.

The present invention will be better illustrated by the following Examples, which have a merely indicative but not limitative purpose of the scope of the invention itself.

EXAMPLES

Example 1

A 3 l jacketed reactor, equipped with mechanical stirrer and directly connected to a volumetric gas reader, is charged with ethanol (770 g), sodium ethoxylate (10 g, 0.147 moles) and $NaBH_4$ (56 g, 1.47 moles). The reaction mixture is then heated to 10° C., maintaining the temperature in external jacket at 8° C. 400 g (0.7 equivalents) of a perfluoropolyoxyalkylene biester of general formula $C_2H_5OOC-CF_2O(CF_2CF_2O)_p-(CF_2O)_qCF_2-COOC_2H_5$ having a number average molecular weight Mn=1121 and an average equivalent weight Ew=573, are fed, under stirring, with a 200 g/h flow-rate.

By maintaining the temperature (8° C.) in the jacket constant for the whole feeding period (2 h), the temperature inside the reactor rises up to 15° C. During the reaction 0.9 litres of $H_2$ develop. At the end of the feeding the unreacted sodium-boron hydride is titrated, and contemporaneously the intermediate boric esters are hydrolized, by feeding them in 1000 g of an aqueous HCl solution at 10% by weight, volumetrically measuring the developed hydrogen moles. The developed hydrogen volume resulted equal to 99.8 litres (4.45 moles), equivalent to 42.3 g (1.11 moles) of unreacted $NaBH_4$. During the reaction an excess of $NaBH_4$ equal to 2.9% with respect to the stoichiometeric value has therefore been consumed.

After the addition to the HCl solution, the reaction mixture is left under stirring at room temperature for about one hour. The phases are then separated and the organic phase is stripped at 60° C./1 mmHg and then analyzed by IR and NMR. The analyses are in agreement with the total reduction of the ester.

Example 2

By using the equipment and the procedures reported in Example 1, ethanol (400 g), potassium ter-butylate (6 g, 0.05 moles) and $NaBH_4$ (32 g, 0.84 moles) are introduced in the reactor. 400 g (0.38 equivalents) of a perfluoropolyoxyalkylene biester of general formula $C_2H_5OOC-CF_2O(CF_2CF_2O)_p-(CF_2O)_qCF_2-COOC_2H_5$ having a number average molecular weight Mn=2045 and an average equivalent weight Ew=1042, are fed, under stirring, with a 400 g/h flow-rate.

By maintaining the temperature (8° C.) in the jacket constant for the whole feeding period (1 h), the temperature inside the reactor rises up to 13° C. During the reaction 1.2 litres of $H_2$ develop. At the end of the feeding the unreacted sodium-boron hydride is titrated, and contemporaneously the intermediate boric esters are hydrolized, by feeding 1000 g of an aqueous HCl solution at 10% by weight, volumetrically measuring the developed hydrogen moles. The developed hydrogen volume resulted equal to 57 litres (2.5 moles), equivalent to 23.75 g (0.625 moles) of unreacted $NaBH_4$. During the reaction an excess of $NaBH_4$ equal to 7% with respect to the stoichiometeric value has therefore been consumed.

Example 3

By using the equipment and the procedures of Example 1, ethanol (103 g) and under stirring metal sodium (0.42 g; 0.2 moles) are introduced in the reactor. When the metal sodium disappears, $NaBH_4$ (8.3 g, 0.22 moles) is then introduced in the reactor. 300 g (0.288 equivalents) of a perfluoropolyoxyalkylene biester of general formula $C_2H_5OOC-CF_2O(CF_2CF_2O)_p-(CF_2O)_qCF_2-COOC_2H_5$ having a number average molecular weight Mn=2045 and an average equivalent weight Ew=1042, are fed, under stirring, with a 150 g/h flow-rate.

By maintaining the temperature (5°) in the jacket constant for the whole feeding period (2 h), the temperature inside the reactor rises up to 12° C. During the reaction 0.25 litres of $H_2$ develop. At the end of the feeding the unreacted sodium-boron hydride is titrated, and contemporaneously the intermediate boric esters are hydrolized, feeding 1000 g of an aqueous HCl solution at 10% by weight, volumetrically measuring the developed hydrogen moles. The developed hydrogen volume resulted equal to 6.7 litres (0.299 moles), equivalent to 2.8 g (0.074 moles) of unreacted $NaBH_4$. During the reaction an excess of $NaBH_4$ equal to 1.8% with respect to the stoichiometeric value has therefore been consumed.

Example 4

By using the equipment and the procedures reported in Example 1, ethanol (102 g), sodium ethylate (1.5 g, 0.022 moles) and $NaBH_4$ (8.5 g, 0.23 moles) are introduced in the reactor. 200 g (0.299 equivalents) of a perfluoropolyoxyalkylene biester of general formula $C_2H_5OOC-CF_2O(CF_2CF_2O)_p-(CF_2O)_qCF_2-COOC_2H_5$ having a number average molecular weight Mn=1311 and an average equivalent weight EW=668, are fed, under stirring, with a 150 g/h flow-rate.

By maintaining the temperature (50) in the jacket constant for the whole feeding period (1.3 h), the temperature inside the reactor rises up to 12° C. During the reaction 0.3 litres of $H_2$ develop. At the end of the feeding the unreacted sodium-boron hydride is titrated, and contemporaneously the intermediate boric esters are hydrolized, feeding 1000 g of an aqueous HCl solution at low by weight, volumetrically measuring the developed hydrogen moles. The developed hydrogen volume resulted equal to 6.9 litres (0.308 moles), equivalent to 2.88 g (0.77 moles) of unreacted $NaBH_4$.

During the reaction an excess of NaBH$_4$ equal to 2.2% with respect to the stoichiometeric value has therefore been consumed.

Example 5 (Comparative)

By using the equipment and the procedures reported in Example 1, the same testing is repeated in absence of the sodium ethoxylate base. 400 g (0.7 equivalents) of a perfluoropolyoxyalkylene biester of general formula C$_2$H$_5$OOC—CF$_2$O—(CF$_2$CF$_2$O)$_p$—(CF$_2$O)$_q$CF$_2$—COOC$_2$H$_5$ having a number average molecular weight Mn=1121 and an average equivalent weight Ew=573, are then fed with a 200 g/h flow-rate.

By maintaining the temperature (8° C.) in the jacket constant for the whole feeding period (2 h), the temperature inside the reactor rises up to 17° C. During the reaction hydrogen development equal to 28 litres is observed. At the end of the feeding the unreacted sodium-boron hydride is titrated, and contemporaneously the intermediate boric esters are hydrolized, feeding 1000 g of an aqueous HCl solution at 10% by weight, volumetrically measuring the developed hydrogen moles. The developed hydrogen volume resulted equal to 72 litres (3.2 moles), equivalent to 30 g (0.8 moles) of unreacted NaBH$_4$. During the reaction an excess of NaBH$_4$ equal to 92% with respect to the stoichiometeric value has therefore been consumed.

Example 6 (Comparative)

By using the equipment and the procedures reported in Example 2, the same testing is repeated in absence of the potassium ter-butoxylated base. 400 g (0.38 equivalents) of a perfluoropolyoxyalkylene biester of general formula C$_2$H$_5$OOC—CF$_2$O(CF$_2$CF$_2$O)$_p$—(CF$_2$O)$_q$CF$_2$—COOC$_2$H$_5$ having a number average molecular weight Mn=2045 and an average equivalent weight Ew=1042, are then fed with a 400 g/h flow-rate.

By maintaining the temperature (8° C.) in the jacket constant for the whole feeding period (2 h), the temperature inside the reactor rises up to 18° C. During the reaction hydrogen development equal to 13 litres is observed. At the end of the feeding the unreacted sodium-boron hydride is titrated, and contemporaneously the intermediate boric esters are hydrolized, feeding 1000 g of an aqueous HCl solution at 10% by weight, volumetrically measuring the developed hydrogen moles. The developed hydrogen volume resulted equal to 45 litres (2 moles), equivalent to 19 g (0.5 moles) of unreacted NaBH$_4$. During the reaction an excess of NaBH$_4$ equal to 78% with respect to the stoichiometeric value has therefore been consumed.

What is claimed is:

1. A process for preparing monofunctional and bifunctional perfluoropolyoxyalkylenes having hydroxyl end groups having structure:

$$T_1\text{—}CFW_1\text{—}O\text{—}R_f\text{—}CFW_2\text{—}T_2 \quad (I)$$

wherein,
  T$_1$, T$_2$, equal to or different from each other, are selected from end groups —CH$_2$OH, or —F, —CF$_3$, —CF$_2$CF$_3$ with the proviso that at least one of T$_1$ and T$_2$ is —CH$_2$OH;
  W$_1$ and W$_2$, equal to or different from each other, are F, CF$_3$;
  R$_f$ is a perfluoropolyoxyalkylene chain having a number average molecular weight 500–10,000 consisting of one or more units selected from the group consisting of:
  —CF$_2$CF$_2$O—, —(CFYO)— wherein Y=F or CF$_3$, —C$_3$F$_6$O—, —CF$_2$(CF$_2$)$_z$O—, and —CR$_4$R$_5$CF$_2$CF$_2$O—;
wherein
  z is an integer equal to 2 or 3;
  R$_4$ and R$_5$, equal to or different from each other, are selected from H, Cl, linear or branched perfluoroalkyl group having a number of C atoms from 1 to 4;
  said units being statistically distributed along the perfluoropolyoxyalkylene chain;
  said process comprising the following steps:
    a) adding, under inert gas atmosphere, an ester precursor having structure (I) and end groups, equal to or different from each other, selected from —F, —CF$_3$, —CF$_2$CF$_3$, —COOR (R=linear or branched alkyl group having a number of C atoms from 1 to 5), with the proviso that at least one of the end groups is —COOR, in a reaction mixture formed by:
      an inert or protic reaction solvent;
      a reducing agent selected from the metal hydride class;
      an unreactive organic base with respect to the ester;
    b) hydrolysis of the product obtained in step a) for obtaining the compounds of structure (I).

2. A process according to claim 1, wherein the organic base is selected from alcoholates and thioalcoholates of alkaline or alkaline-earth metals, having alkyl, cycloaliphatic, aromatic chain or combinations thereof; nitrogenous bases selected from alkyl, cycloaliphatic and aromatic tertiary amines.

3. A process according to claim 2, wherein the organic base is selected from sodium or potassium alcoholates.

4. A process according to claim 1, wherein the solvents of the reaction are selected from inert solvents; protic solvents; mixtures of inert solvents and protic solvents.

5. A process according to claim 1, wherein the reducing agents are selected from the group of metal hydrides consisting of lithium-aluminum hydride (LiAlH$_4$), sodium-boron hydride (NaBH$_4$), and lithium-boron hydride.

6. A process according to claim 1, wherein R$_f$ has a molecular weight in the range of 500–10,000 and consists of the following repeating units statistically distributed along the polymer chain:
  —(CF$_2$CF$_2$O)—, —(CFYO)— wherein Y is equal to F or CF$_3$,
  —(C$_3$F$_6$O)—,
  —(CF$_2$(CF$_2$)$_z$O)— wherein z is an integer equal to 2 or 3, and
  —CR$_4$R$_5$CF$_2$CF$_2$O— wherein R$_4$ and R$_5$, equal to or different from each other are selected from H, Cl, perfluoroalkyl group having 1–4 C atoms.

7. A process according to claim 6, wherein R$_f$ is selected from:

$$\text{—(CF}_2\text{CF(CF}_3\text{)O)}_a\text{(CFYO)}_b\text{—} \quad (A)$$

wherein Y is F or CF$_3$; a and b are integers such that R$_f$ has a molecular weight in the range of 500–10,000: a/b is in the range 10–100;
or the repeating units mentioned in (A) can be linked as follows:

$$\text{—(CF}_2\text{CF(CF}_3\text{)O)}_a\text{(CFYO)}_b\text{—CF}_2\text{(R'}_f\text{)CF}_2\text{—O—} \\ \text{(CF}_2\text{CF(CF}_3\text{)O)}_a\text{(CFYO)}_b\text{—}$$

wherein R'$_f$ is a fluoroalkylene group from 1 to 4 C;

$$\text{—(CF}_2\text{CF}_2\text{O)}_c\text{(CF}_2\text{O)}_d\text{(CF}_2\text{(CF}_2\text{)}_z\text{O)}_h\text{—} \quad (B)$$

wherein c, d and h are integers such that $R_f$ has a molecular weight in the range of 500–10,000; c/d is in the range 0.1–10; h/(c+d) is in the range 0–0,05, z is an integer equal to 2 or 3, h can also be equal to 0;

$$—(CF_2CF(CF_3)O)_e(CF_2CF_2O)_f(CFYO)_g—\quad\text{(C)}$$

wherein Y is F or $CF_3$; e, f, g are integers such that $R_f$ has a molecular weight in the range of 500–10,000; e/(f+g) is in the range 0.1–10, f/g is in the range 2–10;

$$—(CF_2(CF_2)_zO)_s—\quad\text{(D)}$$

wherein s is an integer such that $R_f$ has a molecular weight in the range of 500–10,000, z is an integer equal to 2 or 3;

$$—(CR_4R_5CF_2CF_2O)_{j'}—\quad\text{(E)}$$

wherein $R_4$ and $R_5$ are equal to or different from each other and selected from H, Cl or perfluoroalkyl group, j' being an integer such that $R_f$ has a molecular weight in the range of 500–10,000; said unit inside the fluoropolyoxyalkylene chain can be linked to each other as follows:

$$(CR_4R_5CF_2CF_2O)_{p'}—R'_f—O—(CR_4R_5CF_2CF_2O)_{q'}—$$

wherein $R'_f$ is a fluoroalkylene group, p' and q' are integers such that $R_f$ has a molecular weight in the range of 500–10,000;

$$—(CF(CF_3)CF_2O)_{j''}—\quad\text{(F)}$$

j" being an integer such that $R_f$ has a molecular weight in the range of 500–10,000.

8. A process according to claim 1, wherein the reaction temperature ranges between 0° C. and the boiling temperature of the solvent.

9. A process according to claim 1, wherein the reducing agent is in an amount in the range 0.1–15% by weight with respect to the solvent weight.

10. A process according to claim 1, wherein the organic base amount ranges from 0.1 to 100% by moles with respect to the reducing agent.

11. A process according to claim 1, wherein the excess of reducing agent is in the range 0–30%.

12. A process according to claim 1, wherein the hydrolysis (step b) is carried out by adding the reaction product of step a) to an aqueous HCl solution, at a concentration of 5–10% by weight, in equiponderal amount with respect to the initially fed ester; alternatively, by adding water in a ratio by weight 2:1 with respect to the initially fed ester.

13. A process according to claim 4, wherein the inert solvents are selected from the group consisting of tetrahydrofuran, diglyme and dioxane.

14. A process according to claim 1, wherein the protic solvents are selected from the group consisting of methanol, ethanol, isopropanol and isobutanol.

* * * * *